United States Patent
Benton

[11] 3,944,322
[45] Mar. 16, 1976

[54] LIGHT FILTERING ARRANGEMENT FOR HOLOGRAPHIC DISPLAYS

[75] Inventor: Stephen A. Benton, Somerville, Mass.

[73] Assignee: Polaroid Corporation, Cambridge, Mass.

[22] Filed: Jan. 16, 1975

[21] Appl. No.: 541,608

[52] U.S. Cl. .................................. 350/3.5; 350/319
[51] Int. Cl.² ............................................ G03H 1/22
[58] Field of Search ................................... 350/3.5

[56] References Cited
UNITED STATES PATENTS

| | | | |
|---|---|---|---|
| 3,653,138 | 4/1972 | Cooper | 350/160 LC |
| 3,811,751 | 5/1974 | Myer | 350/160 LC |
| 3,838,903 | 10/1974 | Leith et al. | 350/3.5 |

OTHER PUBLICATIONS
"The New Art of Holography" Conductron Corp. Reprint from World Book Science Annual 1967, pp. 201–209.
*Laser Focus*, July 1968, New Products Section, p. 82.
Jeong, *Jour. of the Optical Society of America*, Vol. 57, No. 11, Nov. 1967, pp. 1396–1398.

*Primary Examiner*—Ronald J. Stern
*Attorney, Agent, or Firm*—Edward S. Roman

[57] ABSTRACT

A holographic arrangement is provided with light filtering means for transmitting only those light rays to the hologram which are incident to the hologram at the prescribed angles required for substantial diffraction while at the same time operating to preclude the transmission of other light rays to the hologram which would otherwise be incident to the hologram at angles outside the prescribed range of angles required for substantial diffraction by the hologram. In this manner background light which would otherwise be transmitted through a hologram so as to degrade the quality of a stereoscopic image reconstructed from the hologram is precluded from ever reaching the viewing area.

13 Claims, 8 Drawing Figures

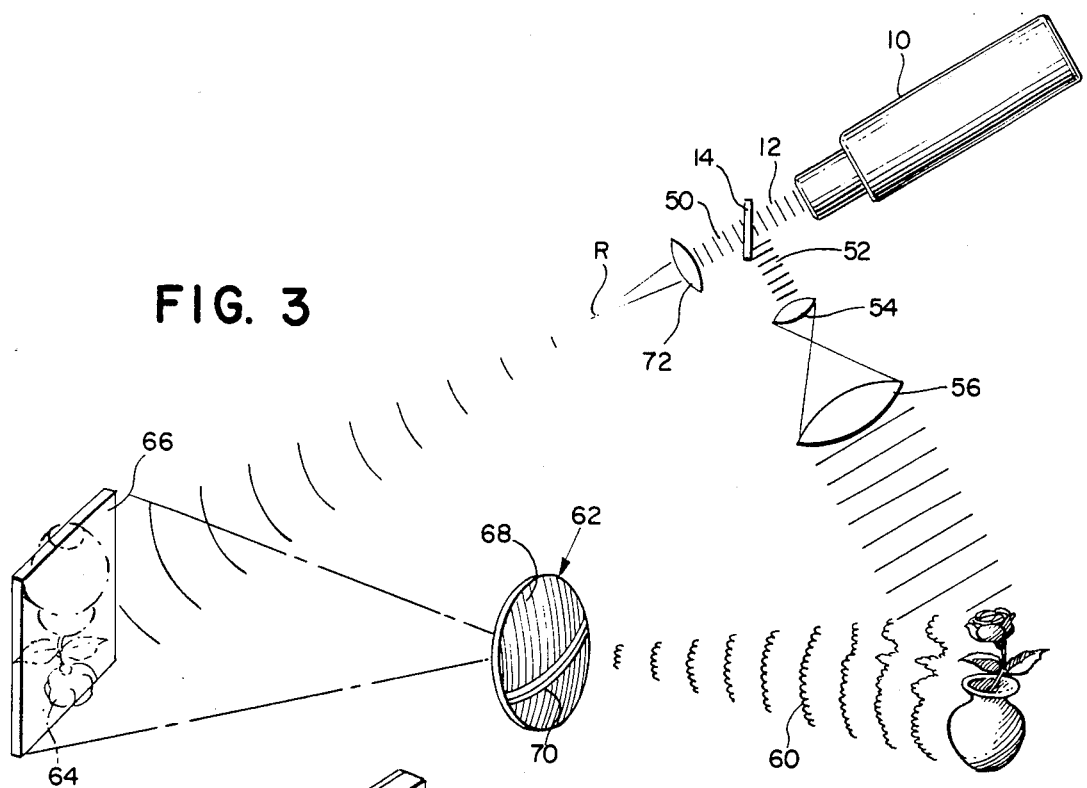
FIG. 3
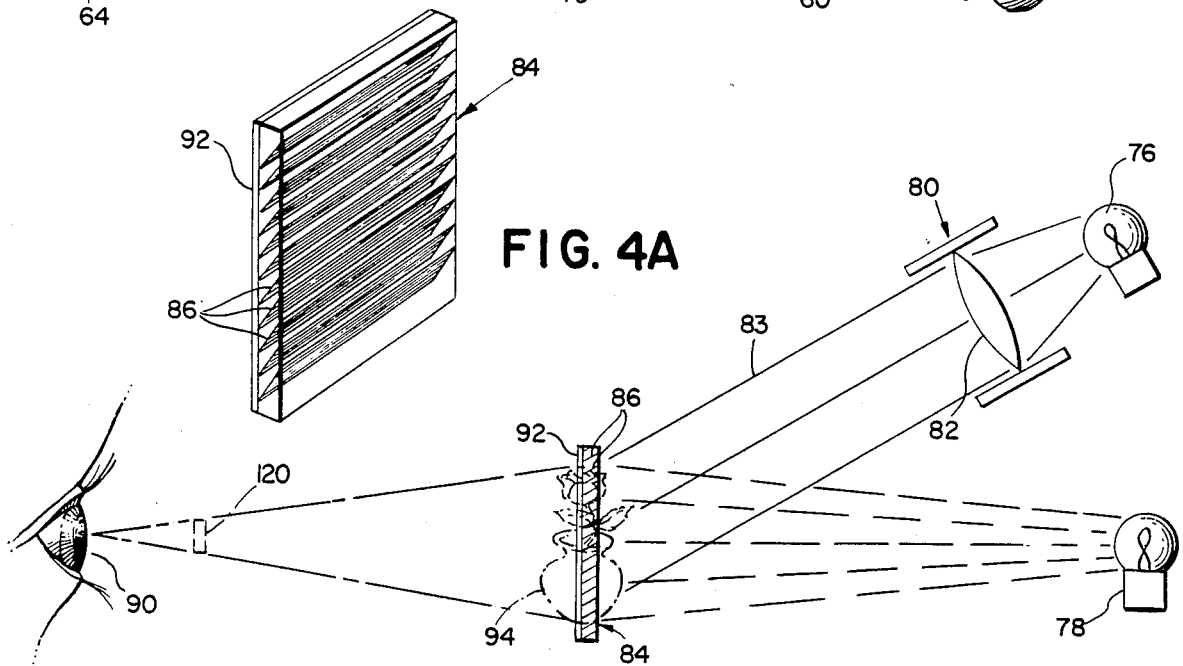
FIG. 4A
FIG. 4

LIGHT FILTERING ARRANGEMENT FOR HOLOGRAPHIC DISPLAYS

BACKGROUND OF THE INVENTION

1. Field of the Invention

This invention relates generally to a light-filtering arrangement for holographic displays and, more particularly, to a light-filtering arrangement for a holographic display for substantially reducing extraneous background light which would otherwise be transmitted by the hologram without substantial diffraction or absorption so as to reduce the contrast of the reconstructed stereoscopic image.

2. Description of the Prior Art

Holography, which relates to the wavefront reconstruction process by which unusually realistic three-dimensional images are reconstructed from holograms, was first discovered in 1947 by Dennis Gabor of the Imperial College of Science and Technology in London. In general, the making of a hologram requires the use of coherent light, that is, light whose waves are all in phase. The lack of an adequate source of coherent light hampered early efforts at holography. The invention of the laser in 1960 provided a source of coherent light which opened the way to new advances in wavefront reconstruction photography.

One widely used method for making a hologram requires that monochromatic, coherent light from a common source be divided into two components by such well known means as a beam splitter. One component of the coherent source light is then utilized to illuminate a subject whose photographic image is to be recorded. The light waves thereafter reflected from the subject contain all possible optical information regarding the subject and subsequently impinge upon a light sensitive or photographic plate which is exposed by the light waves reflected by the subject. The second component of coherent light is directed to impinge on the same photographic plate and has a wavefront of known and reproducable form. Since the second light component has a known and reproducable wavefront, it operates as a reference beam against which the first light wave, modulated in phase and form by the shape and optical properties of the subject, can be compared. The wavefront of the reference beam thus interferes with a reflected wavefront from the subject at the light sensitive plate to create a diffraction pattern uniquely related to the subject. A hologram is the term commonly associated with a diffraction pattern recorded in this manner. Holography differs from ordinary photography in that an enormous amount of phase modulation information is discarded through ordinary photography whereas holography utilizes optical interference with a reference beam as a means for converting phase modulation into a recordable quantity.

Viewing may be accomplished by illuminating the holographic image with a beam of monochromatic coherent light similar to that of the reference light. Light incident to the hologram at angles within a prescribed range is diffracted by the hologram. This diffraction light forms a wavefront identical in form and direction to the one originally emanating from the subject, and an observer viewing this diffracted wavefront sees a three-dimensional stereoscopic virtual image of the original subject. Viewing is generally done by looking through the plate on which the holographic image is recorded and the virtual stereoscopic image appears in relation to the hologram in a position corresponding directly with the original subject position. Thus, holography is a means of reducing three-dimensional imagry to a two-dimensional format and subsequently reconstructing the three-dimensional imagry.

More recently, techniques for producing so called information limited or low spatial frequency holograms of solid objects have been used. Such techniques are particularly advantageous in that a low spatial frequency hologram with its attendent low dispersion permits the use of ordinary broad band light for reconstruction. Thus the laser as a source of monochromatic coherent light for displaying holographic images is no longer required.

When illuminating a hologram for display purposes, only that portion of the source light incident at a predetermined illumination angle upon the hologram, such as 45° above horizontal, is actually diffracted by the hologram as a result of Bragg selection effects. Light incident at other angles, such as nearly normal to the hologram plate, is transmitted therethrough without substantial diffraction or absorption, thereby degrading the reconstructed holographic images which must be viewed against a background of extraneous light reflected from objects behind the hologram. This extraneous background light which is substantially transmitted through the hologram to the eye of the viewer reduces the contrast, visibility, and apparent sharpness of the reconstructed stereoscopic image, thus necessitating that holograms be generally viewed against darkened wall and/or dimly lit rooms.

Therefore, it is a primary object of this invention to provide a holographic arrangement from which a stereoscopic image of improved contrast, visibility and apparent sharpness may be reconstructed.

It is another object of this invention to provide a holographic arrangement which may be satisfactorily displayed against a background of extraneous light emanating from behind the hologram.

It is a further object of this invention to provide a holographic arrangement which may be utilized to suitably display a stereoscopic image against a background medium other than a blackened wall.

It is an even further object of this invention to provide a holographic arrangement which may be utilized to satisfactorily display a stereoscopic image in a well lighted room.

It is an additional object of this invention to provide a holographic arrangement which accomodates the diffraction of light incident on the hologram at a prescribed illumination angle while at the same time precluding the transmission of light incident at angles other than the prescribed angle.

SUMMARY OF THE INVENTION

The present invention relates to holographic apparatus responsive to the light rays emanating from a light source for displaying stereoscopic images by the technique of wavefront reconstruction. The apparatus comprises a conventional hologram together with a light filtering means disposed intermediate the hologram and light source for transmitting only those light rays which are incident at predetermined angles. In this manner, the light filtering means transmits, without substantial attentuation, only those light rays which impinge upon the hologram at the required angles of diffraction. At the same time, the light filtering means substantially precludes the transmission therethrough of other light rays incident thereon at angles other than the predetermined angles of incidence in this manner substantially blocking out such extraneous background light as may be attributable to the other light rays.

Holograms of the circumferential type suitable for reconstructing a stereoscopic image which may be viewed from around the entire hologram may also be utilized in conjunction with the light filtering means of this invention. Such light filtering means would have to be disposed substantially concentric with respect to the circumferential hologram. Circumferentially disposed light filtering means of this type permit viewing of the stereoscopic image reconstructed by the hologram from light rays diffracted by the hologram while at the same time substantially prohibiting extraneous background light which may impinge upon the outside of the hologram from being transmitted through the hologram to the viewing area.

BRIEF DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment, or when read in connection with the accompanying drawings or in like members having employed in the different figures to note the same parts and wherein:

FIG. 3 is a diagrammatic view showing a conventional arrangement for recording an information-limited hologram;

FIG. 4 is a diagrammatic side view of the holographic arrangement of this invention as illuminated to reconstruct a stereoscopic image;

FIG. 4a is a perspective view of the holographic arrangement of FIG. 4;

DESCRIPTION OF THE PREFERRED EMBODIMENTS

Figure 1:
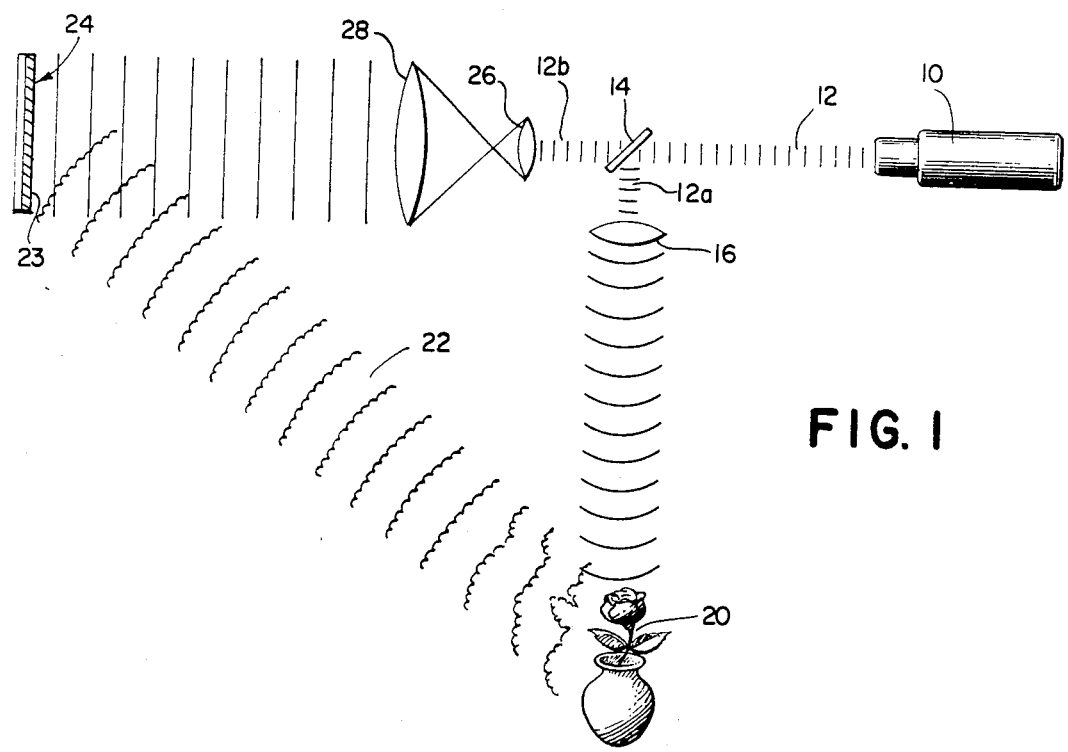
FIG. 1 is a diagrammatic view showing a conventional arrangement for recording a hologram.

Referring now to FIG. 1, there is shown an arrangement through which a conventional hologram can be made. Monochromatic coherent light 12 from a laser 10 is first divided into two components 12a and 12b by a beam splitter 14. Component 12a may be directed through a lense 16 in order to increase the cross-section of light beam 12a. Light beam 12a thereafter illuminates a subject as shown at 20 from whence the illuminating beam 12a is reflected and scattered. A wavefront as shown at 22 is representative of a portion of the light reflected and scattered from the subject 20 and functionally relates to the subject 20. Light reflected from the subject 20 thereafter impinges on a light-sensitive material 23 such as a photographic plate. Wavefront 22 contains all the optional information about subject 20 which is thereafter required to see a three-dimensional stereoscopic view of subject 20.

Component 12b of monochromatic coherent light 12 may also be passed through a telescope comprising lenses 26 and 28 which operate to increase the cross-sectional area of the light beam while also collimating the light beam 12b. Collimated beam 12b is used as a reference beam and thus should be readily reproducible. Reference light beam 12b impinges on a light sensitive surface 23 such that the interference between reference beam 12b and wavefront 22 forms a complex diffraction pattern called a hologram as shown at 24. This diffraction pattern is uniquely related to the subject 20 and would be too complex to be viewed by normal direct observation in a way conventional photographs are viewed. Thus a special illuminating technique is ordinarily required to view a stereoscopic image of the subject.

Figure 2:
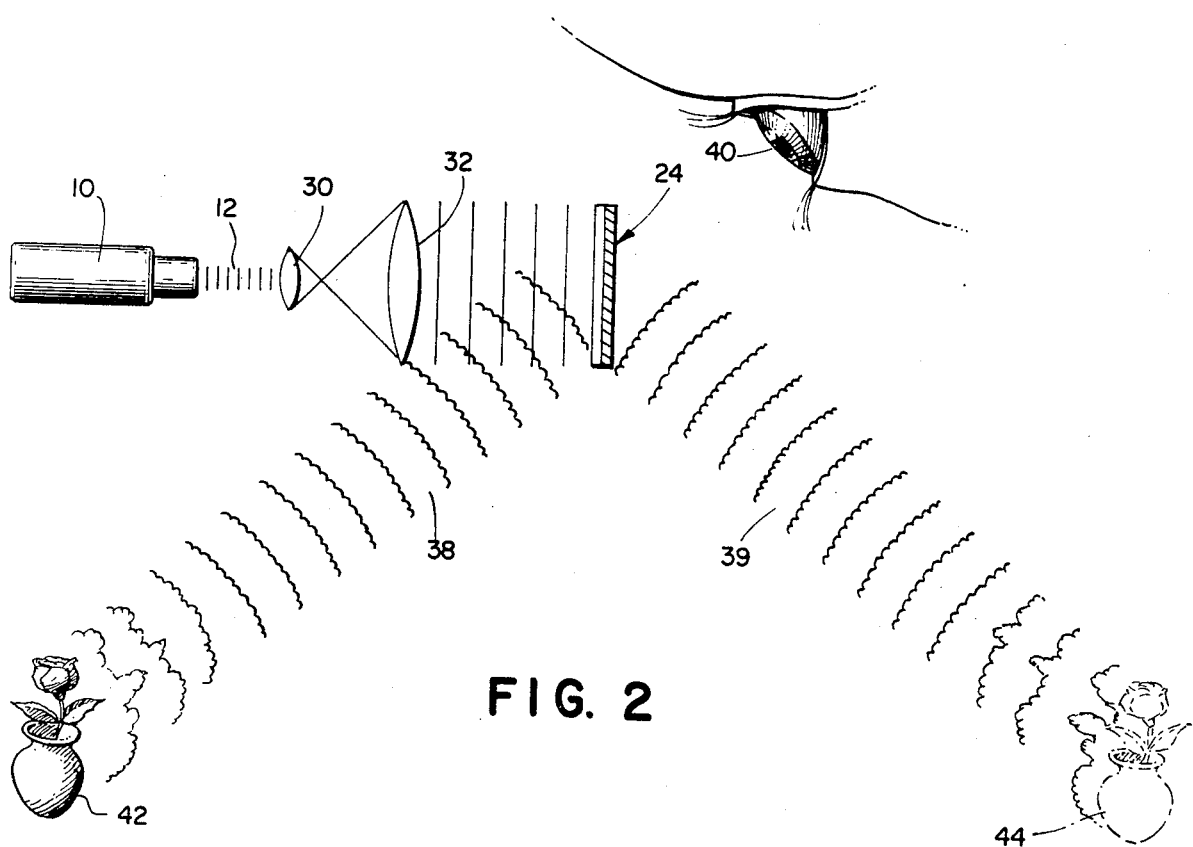
FIG. 2 is a diagrammatic view showing a conventional arrangement for illuminating a holographic display.

FIG. 2 shows one conventional method suited for illuminating the previously made holographic image and forming a virtual stereoscopic image. Laser 10 which emits monochromatic coherent light may again be used to direct light 12 through a telescopic arrangement containing lenses 30 and 32 which operate to increase the cross-sectional area of the light beam 12 while also collimating the light beam 12 in the manner of the collimated reference beam 12b. Hologram 24 is made by the method illustrated in FIG. 1 and when the collimated illumination beam 12 is incident thereon, the holographic image pattern of hologram 24 diffracts a portion of light into two "first order" wavefronts 38 and 39. The first diffracted order of waves 38 project back toward the laser 10 and appear to a viewing eye as stationed at 40 to emanate from an apparent object located in the position where the original subject was located. These waves are said to produce a virtual image as shown at 42. The other first order diffracted waves 39 have conjugate or reversed curvature and produce a real image 44 which is orthoscopic and which can be photographed directly without the need for a lense by simply placing a photographic plate at the position of the image 44.

Most recently, techniques have been developed for producing information limited or bandwidth reduced holograms suitable for reconstruction in ordinary white light. Referring now to FIG. 3, there is shown one arrangement for producing such information limited holograms suitable for illumination by an ordinary broad band white light source. Laser 10 is again utilized to provide a monochromatic coherent beam of light 12 which is subsequently divided by beam splitter 14 into two components 50 and 52. Light beam 52 may have its cross sectional area increased by telescopic lenses 54 and 56 prior to illuminating subject 20. Subject 20 thereafter scatters and reflects light in a complex wave front 60 whose form is functionally related to the subject 20. A large diameter lens 62 is placed to receive wavefronts 60 forming a real image 64 of subject 20 on a photosensitive surface 66. Information limitation is accomplished by placing a mask 68 having a horizontal aperture 70 adjacent to lens 62. Preferably, aperture 70 is horizontal having a width equal to or greater than normal interocular spacing and its height and area are determined by the information reduction ratio as desired. Real image 64 is information limited, however, it retains sufficient information to provide a pleasing stereoscopic viewing experience when illuminated with ordinary white light. Information spatial density is reduced in the transformation of light 60 between aperture 70 and photosensitive surface 66. The monochromatic coherent reference beam 50 is directed onto photosensitive surface 66 where it interferes with image 64 to form a holographic diffraction pattern. Reference beam 50 is preferably directed toward photosensitive surface 66 from a point spaced vertically apart from the aperture 70. As previously discussed, reference beam 50 emanates from the laser 10 and is focused at point R by a lens 72 in this manner providing a predetermined wavefront. The use of the large diameter lens 62 in the above described image transfer and information limiting process results in the image 64 of subject 20 being completely reversed. This reversal must thereafter be corrected during the wavefront reconstruction process. Additional information regarding the production and reconstruction of low spatial frequency holograms may be had by referring to U.S. Pat. No. 3,633,989 issued Jan. 11, 1972, to Stephen A. Benton and assigned in common herewith.

Referring now to FIG. 4, there is shown the arrangement of this invention for reconstructing a stereoscopic image from an information limited or bandwidth reduced hologram of the low spatial frequency type wherein the contrast, visibility, and apparent sharpness of the stereoscopic image is improved by reducing the background light reaching an observer's eye. A point source of illumination 76 may be utilized to provide rays of broad band white light which impinge upon the convex lens 82 of a collimator 80 so as to emit a collimated light beam as shown generally at 83. The parallel rays of the collimated light beam 83 are first directed through a louvered optical filter 84 adjacent a hologram of the information limited type as shown at 92. The louvered optical filter 84 includes a plurality of spaced apart, substantially parallel, louver members 86 which are obliquely angled to receive and transmit the collimated light beam 83 therethrough while at the same time substantially precluding the transmission of other light rays incident thereon at angles other than the angle of incidence of the light beam. Thus the light beam 83 is transmitted through the optical filter 84 so as to be subsequently diffracted by the hologram 92 to provide a stereoscopic image of the subject as shown at 94. As is readily apparent, the angle of incidence of the light beam 83 with respect to the hologram 92 is such that the beam 83 will be substantially diffracted by the hologram.

The stereoscopic image 94 may be viewed from the position as shown at 90 wherein that portion of the stereoscopic image 94 which projects forwardly of the hologram 92 toward the viewer is a real image while that portion of the image which extends backwardly from the hologram 92 and away from the viewer is a virtual image. For information limited holograms of the above described type, it will be appreciated that a real image of the horizontal aperture 70 will be reconstructed as shown at 120 so that the stereoscopic image 94 is viewed by using the aperture image at 120 as a window.

Referring now to the optical filter 84, it can be seen that the plurality of louvers 86 are obliquely angled to correspond with the angle of incidence of the collimated light beam 83 so as to transmit the collimated light beam therethrough without substantial attenuation. By contrast, background light which may be considered as emanating from an imaginary point source as shown at 78 will not be transmitted through the optical filter 84 without impinging upon a louver 86 surface. The designation of an actual source of extraneous background light is only for purposes of illustration and does not imply that such a source would actually have to exist. It should be readily appreciated that extraneous background light may not necessarily be the result of a separate source as shown at 78, but may also result from spurious reflections of the light beam 83 from the hologram and objects therebehind. Thus, in this manner is all background light, whether resulting from separate sources or spurious reflections which would otherwise pass through the hologram, virtually entirely absorbed to improve the contrast, visibility and apparent sharpness of the stereoscopic image 94.

In a preferred arrangement, the plurality of spaced apart louver members 86 are embedded in a transparent medium 87, such as plastic, whereupon the spaced apart louvers must be obliquely angled to coincide with the angle of refraction of the collimated light beam 83 through the transparent medium such that the refracted beam 83 is thereafter incident to the hologram 92 at the required angle for diffraction. One material suitable for use as a louvered optical filter of the type herein described is sold commercially under the trade name "3M Brand Display Film" wherein a plurality of small black louvers are embedded in a transparent plastic medium at angles of approximately 28° which will transmit light rays in air incident thereon at an angle of 45° without substantial attenuation. However, light rays arriving near normal incidence as may be the result of extraneous background light would be almost entirely absorbed. Such a louvered optical filter material has an additional advantage in that it may be readily laminated to the back of the hologram 92 to provide a unitary plate which will transmit an illumination beam incident thereon at a prescribed angle for subsequent diffraction by the hologram, while at the same time blocking out background light incident thereon at angles other than the prescribed angle of incidence which background light would otherwise pass directly through the hologram without being substantially diffracted. Whereas the preferred arrangement for illuminating hologram 92 has been described as including a light collimator 80 to provide the collimated beam 83, it should be readily understood that such a collimator is not absolutely necessary in that the hologram may be illuminated from a point source from whence the illuminating light rays radiate outward therefrom. However, as is readily apparent, the incident angles of light rays from a point source would vary over the surface of the optical filter 84 thus requiring a corresponding variation in the angles of the individual louvers 86. The variation in the angles of the individual louvers 86 must not vary outside the range required for each light ray emanating therefrom to be incident upon the hologram at an angle within the prescribed range of incident angles required for substantial diffraction by the hologram. It should also be readily appreciated that the optical filter 84 of this invention would be suitable for use with more conventional holograms of the type requiring monochromatic coherent light for illumination.

As previously discussed, the background light described as emanating from the imaginary point source as shown at 78 may also in fact result from a portion of the illuminating beam 83 being initially reflected from the hologram surface and thereafter rebounded from objects behind the hologram. Thus, in order to reduce potential background light due to such spurious reflections, it is preferred to deposit a high efficiency, anti-reflection coating to the front surface of the hologram upon which the illuminating beam is incident. Such an anti-reflection coating may comprise a very thin coating of a metallic fluoride applied to the hologram surface.

Figure 5:
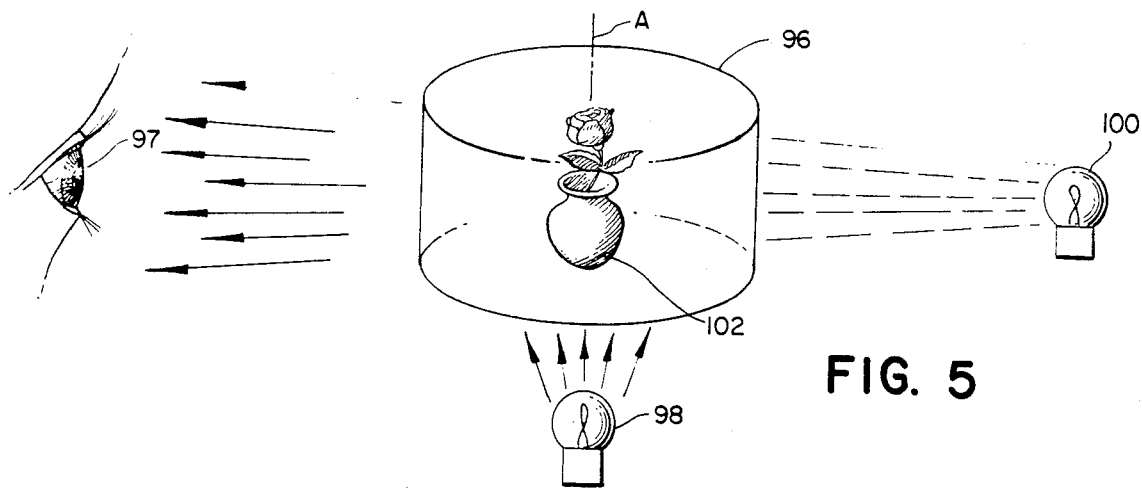
FIG. 5 is a diagrammatic perspective view of a conventional circumferential hologram illuminated to reconstruct a stereoscopic image therewithin.

Referring now to FIG. 5, there is shown a conventional hologram 96 of the circumferential type suitable for reconstructing a stereoscopic image 102 which may be viewed from around the entire hologram 96. These circumferential type holograms are commonly known as cylindrical holograms. Circumferential holograms of this type may also be information-limited in the above-described manner, and thus suitable for viewing with a broad band frequency white light source as shown at 98 preferably stationed along the hologram center axis A in spaced apart relation from one open end of the hologram 96. The reconstructed stereoscopic image 102 appears as a virtual image in the center of the circumferential hologram 96 and provides a full 360° view of the image around the entire hologram. However, extraneous background light which as previously discussed may be considered for purposes of illustration to emanate from an imaginary source as shown at 100, will be transmitted through the hologram 96 to the eye 97 of a viewer, in this manner detracting from the contrast, visibility, and apparent sharpness of the stereoscopic image within the hologram 96.

Figure 6:
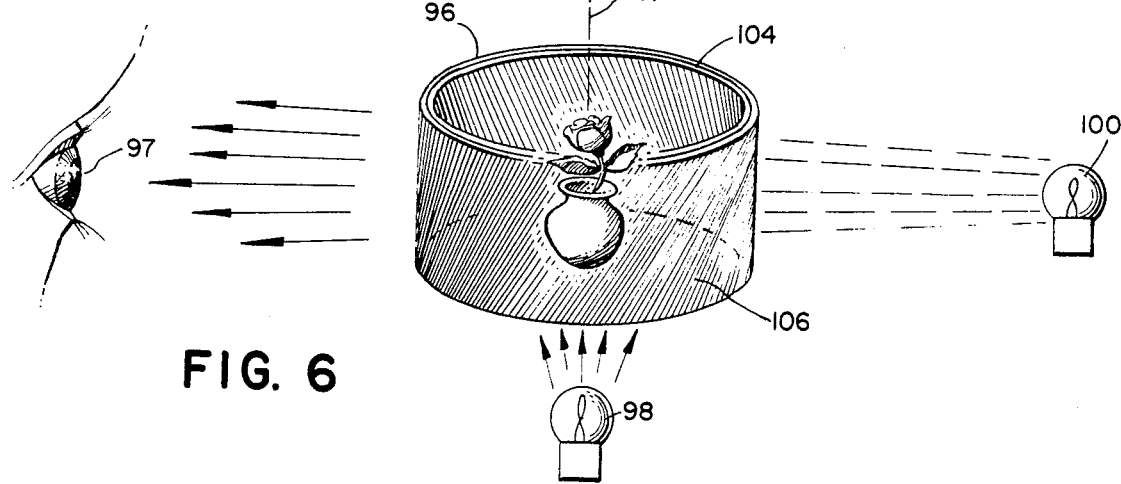
FIG. 6 is a diagrammatic perspective view of the circumferential hologram of this invention as illuminated to reconstruct the stereoscopic image therewithin.

Referring now to FIG. 6, there is shown the circumferential hologram 96 of FIG. 5 wherein a light-polarizing material 104 has been stationed concentric to the circumferential hologram. The light-polarizing material 104 is arranged to polarize light in parallel planes obliquely angled with respect to the hologram center axis A which planes of polarization are diagrammatically represented by the spaced apart lines 106. Thus, extraneous background light incident upon the outside surface of the light-polarizing material 104 is first polarized in a plane oblique to the hologram center axis A, after which this polarized light is transmitted through the circumferentially disposed light-polarizing material 104 to impinge upon the opposing inside surfaces thereof. However, the plane of light-polarization at the opposing inside surface of the light-polarizing material is non-coincident to the plane of the polarized light impinging thereon, and thus operates to substantially absorb the polarized background light in a manner operating to substantially preclude such polarized background light from being transmitted out of the circumferentially arranged light-polarizing material 104. Light rays emanating from the source 98 impinge directly upon the inside surface of the circumferentially arranged light-polarizing material 104, and thus are polarized only once upon being transmitted out of the light-polarizing material to the viewing area. Therefore, as is now readily apparent extraneous background light incident upon the outside surface of the light-polarizing material will be twice polarized in non-coincident planes thus being substantially absorbed before reaching the eye 97 of a viewer, while light from source 98 incident upon the inside surface of the circumferentially disposed light polarizing material 104 will only be once polarized before reaching the eye 97 of an observer. The light-polarizing material may be circumferentially disposed either around the interior surface of the hologram 96 or around the exterior surface of the hologram 96 with the planes of light polarization being arranged preferably at an angle of 45° with respect to the hologram center axis A in order to achieve maximum absorption of the background light.

Figure 7:
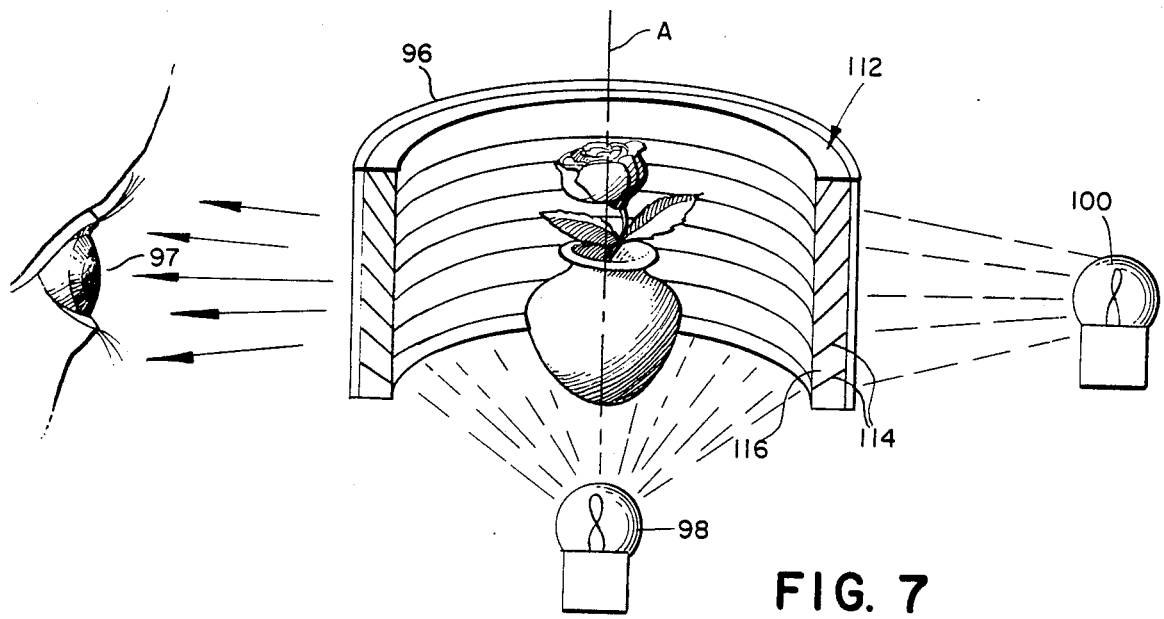
FIG. 7 is a cross-sectional perspective view of an alternate arrangement for circumferential holographic arrangement of this invention as illuminated to reconstruct a stereoscopic image therewith.

Referring now to FIG. 7, there is shown an alternate arrangement for an optical filter of the louvered type which may be used in conjunction with the circumferential hologram 96 to substantially preclude the transmission of background light through the hologram 96. The hologram 96 may again be of the information-limited type suitable for use with the broad band frequency, white light source 98 disposed along the hologram center axis A. The optical filter 112 extends circumferentially around the inside of the hologram 96 and preferably comprises a plurality of axially spaced apart, circumferential louver members 114, each of which is obliquely angled with respect to the hologram center axis A to accomodate the transmission of source light rays incident thereon. As should be readily appreciated, the oblique angles of the individual louver members 114 become more acute as the distance from the light source 98 to respective louvers 114 increases. Thus, the spaced-apart louvers 114 of the optical filter 112 operate to transmit only those extraneous background light rays which are incident upon the outside surface thereof at angles substantially corresponding to the oblique angles of the individual louvers 114. Extraneous background light rays transmitted through the optical filter 112 in this manner are subsequently intercepted upon their impingement on the opposing interior surface of the optical filter. In other words, rays of extraneous background light, as may be emitted by the imaginary source 100, will not be transmitted laterally through the optical filter to the eye 97 of the observer on the opposing side. However, light rays radiating outward from the source 98 impinge directly upon the inside surface of the optical filter 112 at angles corresponding to the oblique angles of the individual louvers 114, and thus are transmitted through the louvers 114 to the eye 97 of a viewer. Although the light source 98 may be stationed anywhere along the hologram center axis A intermediate the opposed ends thereof, it is again preferable that the light source 98 be stationed slightly apart from one open end of the hologram so that all the radiating source light rays will be obliquely incident to the hologram 96 at angles within the prescribed range of incident angles required for substantial diffraction. Should the light source 98 be stationed intermediate the open ends of the hologram 96, it would then be preferable for the optical filter 112 to block those light rays emanating from the light source 98 at angles nearly normal to the hologram center axis A since these light rays would likely not be diffracted by the hologram 96 and thus would pass directly through the hologram 96 to the eye 97 of an observer.

The individual louver members 114 may once again be embedded in a transparent plastic medium 116 wherein the individual louver members 114 are obliquely angled to correspond with the angles of refraction of the source light rays through the transparent medium 116 such that the refracted rays thereafter impinge on the hologram 96 at the angles required for substantial diffraction. The individual louver members 114 may also be provided with a black outer surface in order to substantially absorb all of the incident extraneous background light rays without significant reflection. In addition, the optical filter 112 may also be laminated to the inside surface of circumferential hologram 96, in this manner providing a unitary structure suitable for displaying stereoscopic images with a minimum of extraneous background light reaching the eye of an observer.

Thus, the optical filter arrangement of this invention, when used in conjunction with a conventional hologram, operates to improve the contrast, visibility, and apparent sharpness of the stereoscopic image reconstructed from the hologram. Therefore, it is no longer necessary to view a reconstructed stereoscopic image against a blackened wall and/or a dimly lit room as was heretofore required to achieve an acceptable image quality. The extraneous background light from source and/or objects located behind the hologram which in the past have been transmitted thru the hologram without sufficient diffraction or absorption is now intercepted by the optical filtering arrangement herein described and claimed. The optical filter and hologram arrangement of this invention may be practiced or embodied in still other ways without parting from the spirit or essential character thereof. Therefore, embodiments described herein are illustrative and not restrictive, the scope of invention being indicated by the appended claims and all variations which come within the means of the claims are intended to be embraced therein.

What is claimed is:

1. Apparatus responsive to the light rays emanating from a light source for displaying images by the technique of wavefront reconstruction comprising:
   a hologram; and
   light filtering means directly adjacent said hologram and intermediate said hologram and light source for transmitting without substantial attenuation only light rays therethrough which are incident thereon at predetermined angles in order that the transmitted light rays be incident to said hologram only at angles within the range of angles required for substantial diffraction while at the same time substantially precluding the transmission therethrough of other light rays incident thereon at angles other than said predetermined angles of incidence, in this manner substantially blocking out such extraneous background light as may be attributable to the other light rays, wherein said light filtering means includes a plurality of spaced apart louvers angled to receive and transmit the light rays incident thereon at said predetermined angles while at the same time substantially precluding the transmission of other light rays incident thereon at angles other than said predetermined angles.

2. The apparatus of claim 1 wherein said plurality of spaced apart louvers are embedded in a transparent medium and angled to coincide with the angles of refraction through said transparent medium of those light rays incident thereon at said predetermined angles thereby substantially transmitting only the light rays therethrough which impinge upon said hologram at the angles required for diffraction while at the same time substantially precluding the transmission of other light rays refracted by said transparent medium at angles other than the angles of said louvers.

3. The apparatus of claim 2 wherein said transparent medium is plastic and said light filtering means is laminated directly to said hologram.

4. The apparatus of claim 3 wherein said louvers are black to absorb the light rays which impinge directly on the louver surfaces without substantial reflections.

5. The apparatus of claim 1 including an anti-reflection coating on said hologram in order to reduce extraneous background light resulting from reflections of said source light upon said hologram.

6. The apparatus of claim 1 wherein said light source emits a broad band white light beam and said hologram is a low spatial frequency hologram suitable for wavefront reconstruction by a source of white light.

7. Apparatus responsive to the light rays emanating from a light source for displaying images by the technique of wavefront reconstruction comprising:
   a cylindircal hologram suitable for reconstructing a stereoscopic image which may be viewed from around the entire hologram; and
   light filtering means substantially concentric with respect to said hologram for permitting viewing of the stereoscopic image reconstructed by the hologram from light rays diffracted by the hologram while at the same time substantially prohibiting other light rays which may impinge upon the outside of said cylindrical hologram from being transmitted through said cylindrical hologram to a viewing area outside of said cylindrical hologram.

8. The apparatus of claim 7 wherein said light filtering means includes a light polarizing material for polarizing light in a plane oblique to the hologram center axis such that light incident upon the outside surface of said filtering means is first polarized in a plane oblique to the hologram center axis afterwhich the polarized light is transmitted through said filtering means to impinge upon the opposing inside surface of said light polarizing material which plane of polarization is non-coincident to the plane of the polarized light thereby absorbing the polarized light in a manner operating to substantially prohibit light incident upon the outside of said light filtering means from being transmitted entirely through said light filtering means while at the same time permitting non-polarized light directly incident upon the interior of said light filtering means to be polarized and transmitted out of said light filtering means.

9. The apparatus of claim 8 wherein said light filtering means includes a plurality of spaced apart louvers obliquely angled to receive and transmit only those light rays which are incident at substantially corresponding angles upon the outside surface thereof and to substantially prohibit such transmitted light rays from being transmitted entirely through the light filtering means by intercepting said transmitted light rays upon their impingement on the opposing inside surface of said light filtering means while at the same time permitting those light rays which are not initially intercepted or transmitted through the outside surface of the light filter means, but which instead impinge directly upon the inside surface thereof in substantial correspondence with the oblique angles of said louvers, to be transmitted therethrough and subsequently diffracted by the hologram.

10. The apparatus of claim 8 wherein said plurality of louvers are embedded in a transparent medium and the spaced apart louvers are angled in correspondence with the angles of refraction of those light rays in the transparent medium which subsequently impinge upon the hologram at the angles required for substantial diffraction.

11. The apparatus of claim 9 wherein said transparent medium is plastic and said light filtering means is laminated directly to said hologram.

12. The apparatus of claim 8 wherein said light source emits a broad band white light beam and said hologram is a low spatial frequency hologram suitable for wavefront reconstruction by a source of white light.

13. The apparatus of claim 8 wherein the light source is a point source stationed along the center axis of said hologram and said louvers include a plurality of axially spaced apart circumferential members substantially concentric with respect to said hologram center axis and suitably angled to allow the transmission of substantially all light rays emanating from the point source whose angles of incidence on the hologram is within the range of incident angles required for diffraction.

* * * * *